(12) United States Patent
Shiu et al.

(10) Patent No.: US 11,167,606 B2
(45) Date of Patent: Nov. 9, 2021

(54) TOW DEVICE FOR AUTOMATED GUIDED VEHICLE

(71) Applicant: United States Postal Service, Washington, DC (US)

(72) Inventors: Leung Man Shiu, Gaithersburg, MD (US); Edward F. Houston, Bristow, VA (US); Anthony B. Taylor, Stafford, VA (US); Scott R. Bombaugh, Burke, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 16/883,132

(22) Filed: May 26, 2020

(65) Prior Publication Data

US 2020/0376909 A1     Dec. 3, 2020

Related U.S. Application Data

(60) Provisional application No. 62/853,366, filed on May 28, 2019.

(51) Int. Cl.
| | | |
|---|---|---|
| *B60D 1/14* | (2006.01) | |
| *B60D 1/167* | (2006.01) | |
| *B60D 1/54* | (2006.01) | |
| *B60D 1/00* | (2006.01) | |

(52) U.S. Cl.
CPC ............ *B60D 1/141* (2013.01); *B60D 1/1675* (2013.01); *B60D 1/54* (2013.01); *B60D 2001/006* (2013.01)

(58) Field of Classification Search
CPC ...... B60D 1/141; B60D 1/167; B60D 1/1675; B60D 1/481; B60D 1/54; B60D 2001/006
USPC .................... 280/491.1, 491.3, 491.4, 491.5
See application file for complete search history.

(56) References Cited

U.S. PATENT DOCUMENTS

| | | | | |
|---|---|---|---|---|
| 5,421,599 A * | 6/1995 | Maines | ................ | B60D 1/167 |
| | | | | 280/406.2 |
| 5,775,714 A * | 7/1998 | Meadows | ............. | B60D 1/143 |
| | | | | 280/458 |
| 6,502,847 B1 * | 1/2003 | Greaves | ................... | B60D 1/00 |
| | | | | 280/491.1 |
| 7,837,216 B1 * | 11/2010 | Greaves, Jr. | ........... | B60D 1/167 |
| | | | | 280/491.4 |
| 8,360,459 B2 * | 1/2013 | Holtan | ................. | B62B 5/0079 |
| | | | | 280/495 |

* cited by examiner

*Primary Examiner* — Kevin Hurley
*Assistant Examiner* — Hosam Shabara
(74) *Attorney, Agent, or Firm* — Knobbe Martens Olson & Bear LLP

(57) ABSTRACT

This disclosure relates to systems and methods of towing, hitching, and connecting devices. In particular, this disclosure relates to tow devices, hitches, and connections for towing item containers behind vehicles, both autonomous and manually guided.

19 Claims, 15 Drawing Sheets

TOW DEVICE FOR AUTOMATED GUIDED VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57. This application claims the benefit of priority to U.S. provisional application 62/853,366, filed May 28, 2019, the entire contents of which are hereby incorporated by reference.

BACKGROUND

Field

This disclosure relates to systems and methods of towing, hitching, and connecting devices. In particular, this disclosure relates to tow devices, hitches, and connections for towing item containers behind vehicles, both autonomous and manually guided.

Description of the Related Art

Item delivery is increasing as more consumers purchase items online and have them delivered to their homes or business. Increased item delivery requires the increased movement of large quantities of items. This means that problems facing moving large quantities of items, including hitching item containers to vehicles, towing item containers, and hitching/towing multiple item containers in sequence, are also rising. It is desirable to have towing, hitching, and connection solutions which addresses these problems.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features provide advantages that include towing and connections.

In one aspect, a tow device is disclosed herein. The tow device can include a main body. The main body can have a top portion and a bottom portion. The tow device can include a plurality of legs that can include a fixed leg, a first pivot leg, and a second pivot leg. A first end of the fixed leg can be coupled to the main body such that the fixed leg is immobile in relation to the main body. A first end of each of the first and second pivot legs can be rotatably coupled to the main body. Each of the plurality of legs can include a longitudinal portion extending from the first end of each of the plurality of legs to a second end of each of the plurality of legs. The second end of each of the plurality of legs can have a mating portion extending transversely from the longitudinal portion of each of the plurality of legs.

In some embodiments, the top portion can include at least two apertures formed therein. The bottom portion can include at least two apertures formed therein. Each of the at least two apertures of the top portion can be positioned coaxially with one of the at least two apertures of the bottom portion to define at least two pivot axes.

In some embodiments, the first end of each of the first and second pivot legs can include a joint having an aperture. Each aperture of each joint can be positioned coaxially with one of the at least two pivot axes and between the top portion and the bottom portion. Each joint can be rotatably coupled to the main body by a clevis pin and a cotter pin.

In some embodiments, the top portion can include a handle which comprises a vertical portion and a grasping portion. The vertical portion can extends perpendicularly from a longitudinal plane of the top portion. A grasping portion can extend transversely from the longitudinal axis of the vertical portion.

In some embodiments, the first and second pivot legs can rotate to a position adjacent the fixed leg for compact storage with the tow device.

In some embodiments, the first and second pivot legs can each be removed by removing the clevis and cotter pins.

In another aspect, a tow device described herein can include a main body. The main body can have a top portion, a bottom portion, and a plurality of positioning apertures. The main body can have a plurality of legs that can include a fixed leg, a first pivot leg, and a second pivot leg. A first end of the fixed leg can be coupled to the main body such that the fixed leg is immobile in relation to the main body. A first end of each of the first and second pivot legs can be rotatably coupled to the main body. A locking member can be positioned between the first end and a second end of each of the first and second pivot legs. Each locking member can interface with the plurality of positioning apertures of the main body such that the first and second pivot legs can be disposed in at least a first position and a second position. Each of the plurality of legs can include a longitudinal portion extending from the first end of each of the plurality of legs to the second end of each of the plurality of legs. The second end of each of the plurality of legs can include a mating portion that extends transversely from the longitudinal portion of each of the plurality of legs.

In some embodiments, the top portion can include at least two apertures formed therein. The bottom portion can include at least two apertures formed therein. Each of the at least two apertures of the top portion can be positioned coaxially with one of the at least two apertures of the bottom portion to define at least two pivot axes. The first end of each of the first and second pivot legs can include a joint having an aperture. Each joint can be positioned coaxially with one of the at least two pivot axes and between the top portion and the bottom portion.

In some embodiments, the plurality of positioning apertures can be disposed on the top portion.

In some embodiments, the plurality of positioning apertures can include a pair of outer positioning apertures and a pair of inner positioning apertures. The outer positioning apertures can position the first and second pivot legs in an outer position, defining an outer angle, when each locking member is interfacing with the outer positioning apertures. The inner positioning apertures can position the first and second pivot legs in an inner position, defining an inner angle that is smaller than the outer angle, when each locking member is interfacing with the inner positioning apertures.

In some embodiments, each of the locking members can extend transversely from the longitudinal portion of each of the first and second pivot legs.

In some embodiments, the first and second pivot legs can rotate to a position adjacent the fixed leg with the locking members disengaged from the plurality of positioning apertures.

In some embodiments, the first and second pivot leg are each configured to be removed by removing the clevis and cotter pins.

In some embodiments, a tow device is disclosed herein. The tow device can include a fixed leg that can have a first end and a second end. The first end can include a first mating portion and the second end can have a second mating portion. The first and second mating portions can extend transversely from a longitudinal direction of the fixed leg. The tow device can include a pivot leg that can have a first end and second end. The first end of the pivot leg can be rotatably coupled proximate to the first end of the fixed leg. The second end of the pivot leg can have a second mating portion. The second mating portion of the second end of the pivot leg can extend transversely from a longitudinal portion extending between the first and second ends of the pivot leg.

In some embodiments, the tow device can include a top portion and a bottom portion. The top portion and bottom portion can be coupled to the fixed leg such that the top portion and bottom portion are offset from each other. The first end of the pivot leg can be positioned between the top portion and bottom portion. The first end of the pivot leg can be rotatably coupled to the fixed leg by a pin extending through the first end of the pivot leg, top portion, and bottom portion.

In some embodiments, the pivot leg can include an aperture on the first end through which the pin can be inserted. The pin can be coupled to the top portion and bottom portion.

In some embodiments, an offset distance between the top and bottom portions can be greatest where the pivot leg is disposed between the top and bottom portions.

In some embodiments, the fixed leg and/or the pivot leg can include an extrusion that extends transversely from a longitudinal direction of the respective leg from which the extrusion extends. The extrusion can prevent the second ends of the fixed leg and pivot leg from touching.

In some embodiments, the pivot leg can rotate to a position proximate the fixed leg for compact storage.

In some embodiments, a handle can be positioned on the first end of the fixed leg. The handle can include a vertical portion that can extend in a direction opposite the mating portion of the first end of the fixed leg.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1A:
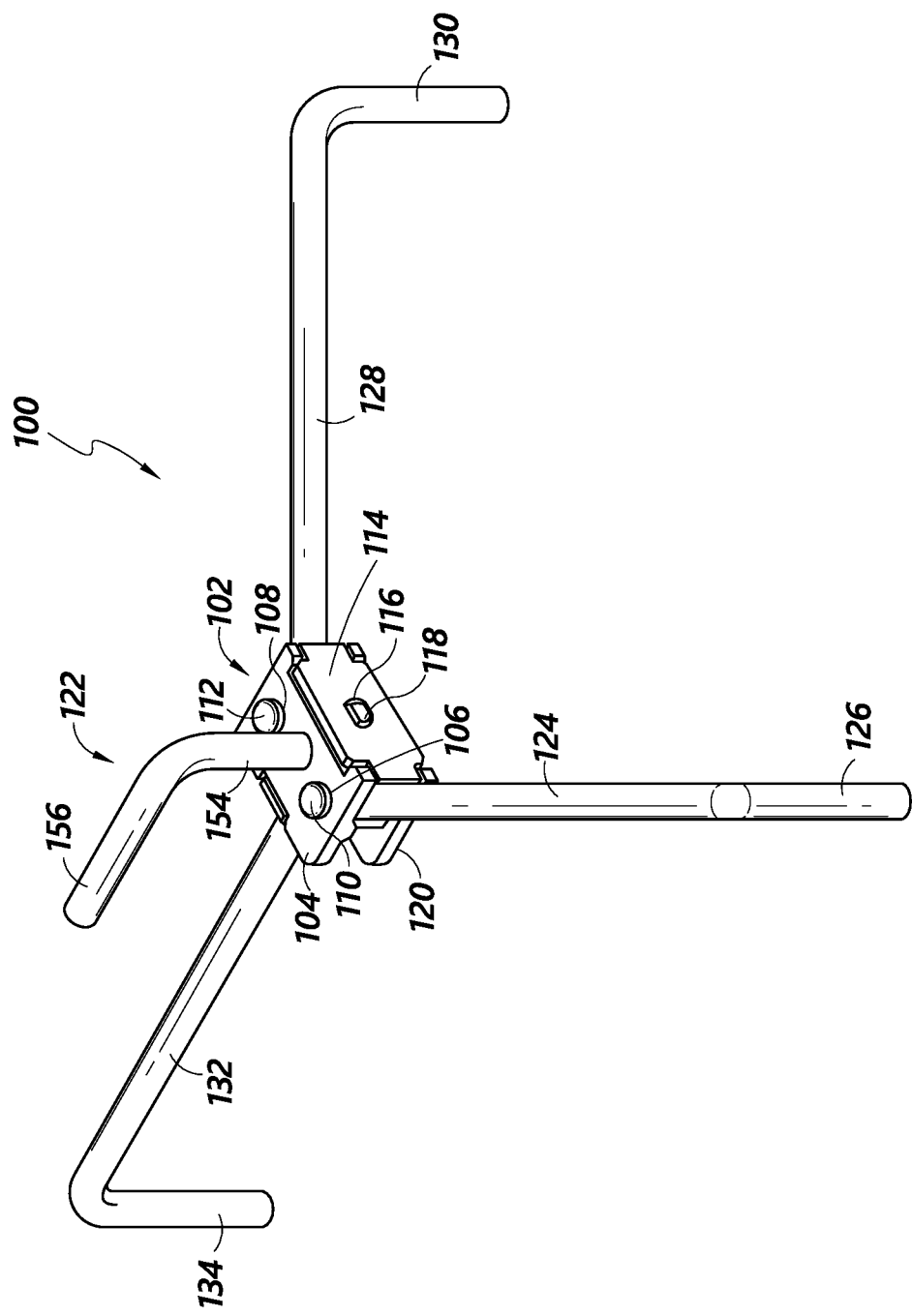
FIG. 1A illustrates a top perspective view of an example tow device.

In the following detailed description, reference is made to the accompanying drawings, which form a part thereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

The quantity of items, such as packages and parcels, being delivered to homes and businesses is rising. Often large quantities of items need to be moved quickly and efficiently. Consequently, distribution networks, such as the United States Postal Service (USPS), sometimes use vehicles to tow one or more item containers, such as rigid and collapsible wire containers, pallets, wheeled shelves, bins, pouches, bags, containers, and rolling stock to move large quantities of items in an efficient manner. Item containers can have hitch connections at varying positions, and if an inappropriate tow device is used, item containers can be damaged, vehicle and operator efficiency can be reduced, and/or items can be damaged. Accordingly, distribution networks can use adjustable tow devices to quickly and efficiently hitch item containers to each other and/or towing vehicles.

Example Tow Device

Figure 1B:
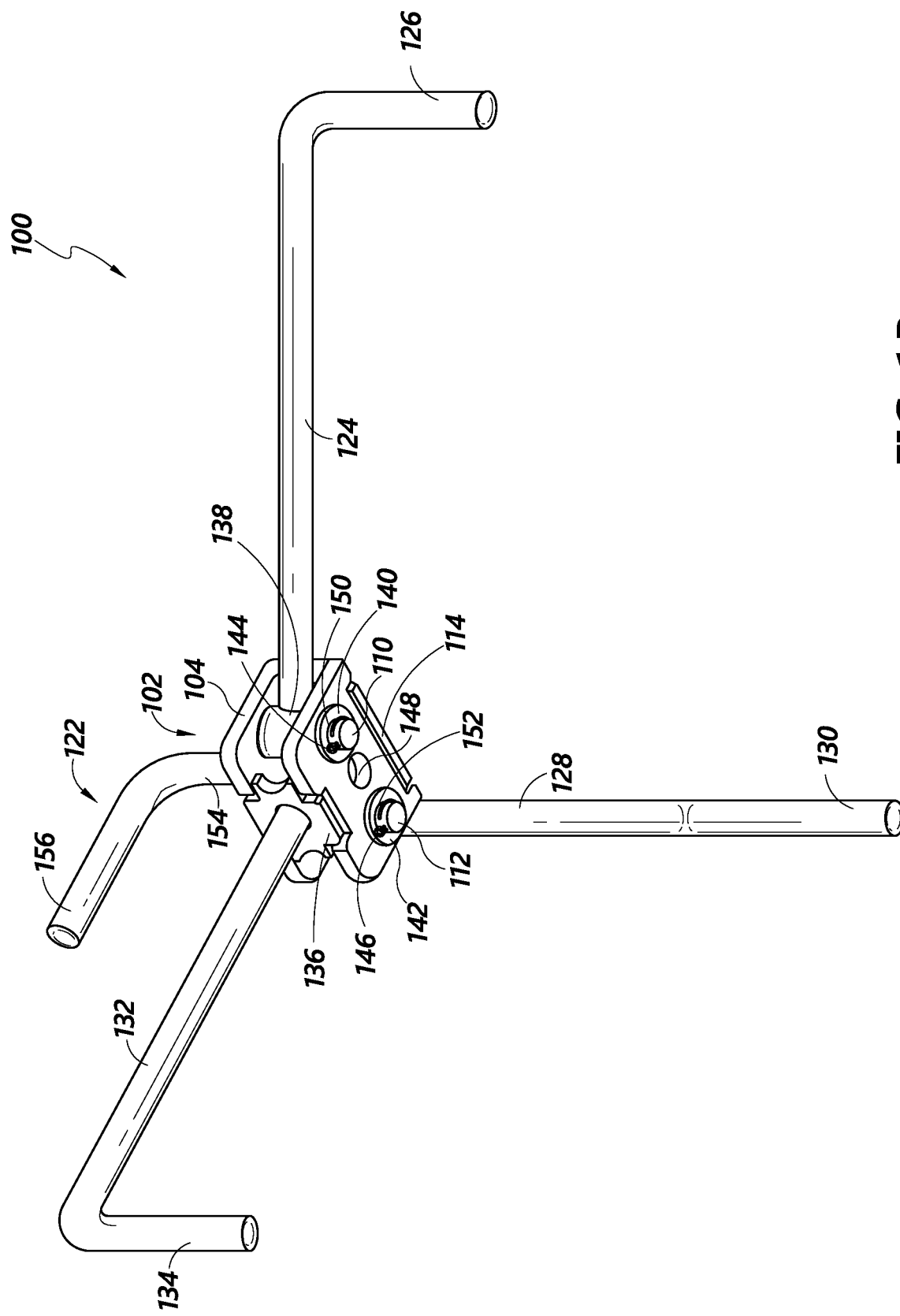
FIG. 1B illustrates a bottom perspective view of the example tow device of FIG. 1A.

FIG. 1A-1D are illustrations of an embodiment of a tow device. FIG. 1A illustrates a tow device 100 with a main body 102. The main body 102 has a top portion 104, a back portion 114, a bottom portion 120, and, as shown in FIG. 1B, a front portion 136. In some embodiments, the top portion 104, back portion 114, bottom portion 120, and/or front portion 136 are different portions of a monolithic main body 102. In some embodiments, top portion 104, back portion 114, bottom portion 120, and/or front portion 136 are coupled together. In some embodiments, top portion 104, back portion 114, bottom portion 120, and/or front portion 136 are welded together. In some embodiments, each of the top portion 104, back portion 114, bottom portion 120, and/or front portion 136 are formed from plates and/or sheets of material having thicknesses of ¹⁄₁₆ inch to ¾ inch. In some embodiments, bottom portion 120 has a center bottom aperture 148.

As shown in FIG. 1A, the top portion 104 has a handle 122 that is configured to be grasped by a user. The handle 122 has a vertical portion 154 and a grasping portion 156. The vertical portion 154 extends perpendicularly from a top surface of the top portion 104. The grasping portion 156 extends transversely from the longitudinal axis of the vertical portion 154. The grasping portion 156 extends perpendicularly from the longitudinal axis from the vertical portion 154. The grasping portion 156 is parallel with the fixed leg 132. The grasping portion 156 is offset above the fixed leg 132. The handle 122 has a curve between the vertical portion 154 and grasping portion 156. The handle 122 has an angle between the vertical portion 154 and the grasping portion 156. The handle 122 has a ninety-degree angle between the vertical portion 154 and grasping portion 156. The handle 122 has a cross-section that is circular. In some embodiments, the handle 122 has a cross-section that is any shape, including a polygon, circle, oval, and/or another shape or portion of a shape.

The top portion 104 has a first top aperture 106 and a second top aperture 108, each of which extends through the entire top portion 104. In some embodiments, the first top aperture 106 and the second top aperture 108 may extend only partway through the top portion 104. As shown in FIG. 1B, the bottom portion 120 has a first bottom aperture 150 and an second bottom aperture 152, each of which extends through the entire thickness of the bottom portion 120. In some embodiments, the apertures 150, 152 may extend only partway through the top portion 104. The first top aperture 106 and first bottom aperture 150 are positioned coaxially, defining a first pivot axis. The second top aperture 108 and second bottom aperture 152 are positioned coaxially, defining a second pivot axis. A first contact surface 140 radially surrounds the perimeter of the first bottom aperture 150. A second contact surface 142 radially surrounds the perimeter of the second bottom aperture 152. The first contact surface 140 and second contact surface 142 can be made from materials that are resistant to wear, such as metals, metal alloys, polymers, certain ceramics, and/or other suitable materials. In some embodiment, the first contact surface 140 and second contact surface 142 are flush with the bottom surface of bottom portion 120. In some embodiments, the first contact surface 140 and second contact surface 142 are any shape, including a polygon, circle, oval, and/or another shape or portion of a shape. In some embodiments, the first contact surface 140 and the second contact surface 142 are made of the same material as bottom portion 120. In some embodiments, first contact surface 140 and the second contact surface 142 are made from a different material than bottom portion 120.

A plurality of legs extend away from the main body 102. Three legs extend away from the main body 102—a first pivot leg 124, a second pivot leg 128, and fixed leg 132. The first pivot leg 124, second pivot leg 128, and fixed leg 132 are coupled to the main body 102. A longitudinal portion of each of the first pivot leg 124, second pivot leg 128, and fixed leg 132 extends away from the main body 102 and terminates with a mating portion. The first pivot leg 124 has a first mating portion 126, the second pivot leg 128 has a second mating portion 130, and the fixed leg 132 has a fixed mating portion 134. The first mating portion 126, second mating portion 130, and fixed mating portion 134 extend transversely, respectively, from the longitudinal portion of each of the first pivot leg 124, second pivot leg 128, and fixed leg 132. The first mating portion 126, second mating portion 130, and fixed mating portion 134 extend in a direction that is perpendicular to the planar surface of the top portion 104 and/or bottom portion 120. The first mating portion 126, second mating portion 130, and fixed mating portion 134 are configured to releasably couple or connect to a hitch, tow pocket, and/or corresponding mating portion. The first mating portion 126, second mating portion 130, and fixed mating portion 134 extend in a direction opposite the vertical portion 154 of the handle 122. The first mating portion 126, second mating portion 130, and fixed mating portion 134 extend in the same direction. In some embodiments, the first mating portion 126, second mating portion 130, and fixed mating portion 134 extend in different directions. In some embodiments, the first mating portion 126, second mating portion 130, and fixed mating portion 134 have recesses, which can include radially recesses, that are configured to interact with a hitch or receiver.

The fixed leg 132 is coupled to the main body 102 such that the fixed leg 132 is immobile relative to the main body 102. The fixed leg 132 is coupled to an aperture 116 on the back portion 114 such that an end portion 118 of the fixed leg 132 is inserted into the aperture 116. The fixed leg 132 goes through and/or is coupled to front portion 136. In some embodiments, the fixed leg 132 is welded to the back portion 114 and/or the front portion 136. In some embodiments, the end portion 118 of the fixed leg 132 is threaded into a portion of the main body 102, such as the back portion 114. The longitudinal portion of the fixed leg 132 is parallel to the grasping portion 156 of the handle 122. The longitudinal portion of fixed leg 132 extends perpendicularly from the back portion 114. The longitudinal portion of fixed leg 132 extends perpendicularly from the front portion 136.

The first pivot leg 124 and second pivot leg 128 are rotatably coupled to the main body 102. In some embodiments, first pivot leg 124 and second pivot leg 128 are coupled to the main body 102 such that the first pivot leg 124 and second pivot leg 128 are fixed relative to the main body. Portions of the fixed leg 132, first pivot leg 124, and second pivot leg 128 have the same cross-sectional shape—a circle—and size. The first pivot leg 124 and second pivot leg 128 are substantially the same. In some embodiments, portions of the fixed leg 132, first pivot leg 124, and second pivot leg 128 have different cross-sectional shapes and sizes, including polygons, circles, ovals, and/or another shape or portion of a shape. In some embodiments, the fixed leg 132, first pivot leg 124, and second pivot leg 128 have an longitudinal-elongate portion that is curved.

Figure 1C:
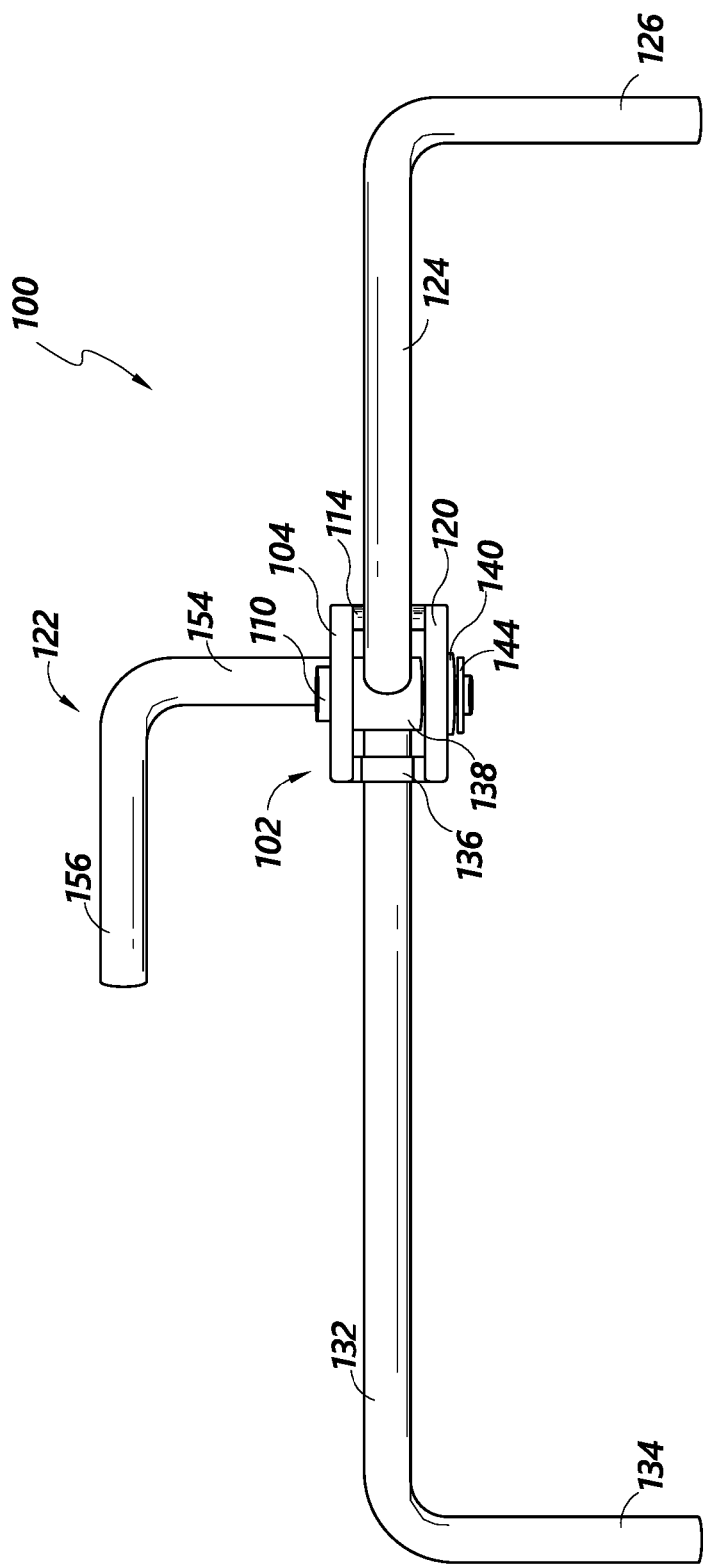
FIG. 1C illustrates a side view of the example tow device of FIG. 1A.

As illustrated in FIG. 1C, the first pivot leg 124 and second pivot leg 128 each have a joint 138. The joints 138 each have an aperture. The aperture of each joint 138 is coaxially aligned with a pivot axis. The aperture of joint 138 of first pivot leg 124 is coaxially aligned with the first pivot axis defined by the first top aperture 106 and the first bottom aperture 150. The joint 138 of the first pivot leg 124 is positioned between the top portion 104 and the bottom portion 120. A first clevis pin 110 is positioned coaxially with the first pivot axis and mates with first top aperture 106, the aperture of joint 138 of the first pivot leg 124, and the first bottom aperture 150. This enables the first pivot leg 124 to rotate about first clevis pin 110. The first clevis pin 110 is releasably secured by a first cotter pin 144. The first clevis pin 110 has a head on one end. An elongate body extends away from the head of the first clevis pin 110. The head of the first clevis pin 110 has a diameter that is larger than the elongate body. The first clevis pin 110 has an aperture, on the end opposite the head, that is configured to interface with first cotter pin 144. First cotter pin 144 interfaces with the aperture, on the end opposite the head, of the first clevis pin 110 to rotatably couple the first pivot leg 124 to the first clevis pin 110 or removed to uncouple the first pivot leg 124 from first clevis pin 110. In some embodiments, the first cotter pin 144 can make contact with first contact surface 140 when inserted through the aperture of first clevis pin 110.

The aperture of joint 138 of second pivot leg 128 is coaxially aligned with the second pivot axis defined by second top aperture 108 and second bottom aperture 152. The joint 138 of second pivot leg 128 is positioned between the top portion 104 and the bottom portion 120. A second clevis pin 112 is positioned coaxially with the second pivot axis defined by second top aperture 108 and second bottom aperture 152 and mates with the second top aperture 108, the aperture of joint 138 of the second pivot leg 128, and second bottom aperture 152. This enables the second pivot leg 128 to rotate about the second clevis pin 112. The second clevis pin 112 is releasably secured by a second cotter pin 146. The second clevis pin 112 has a diameter that is larger than the elongate body. The second clevis pin 112 has an aperture, on the end opposite the head, that is configured to interface with second cotter pin 146. The second cotter pin 146 interfaces with the aperture, on the end opposite the head, of the second clevis pin 112 to rotatably couple the second pivot leg 128 to the second clevis pin 112 or removed to uncouple the second pivot leg 128 from second clevis pin 112. In some embodiments, the second cotter pin 146 can make contact with the second contact surface 142 when inserted through the aperture of second clevis pin 112.

The apertures of joints 138 are generally the same size as or slightly larger than the first top aperture 106, second top aperture 108, first bottom aperture 150, and second bottom aperture 152. The aperture of joints 138 defines an inner perimeter that is cylindrical. The axis of the aperture of joints 138 extends, respectively, perpendicularly from the longitudinal portion of the first pivot leg 124 and the second pivot leg 128. In some embodiments, the inner surfaces of the apertures of joints 138 are configured to aid the rotation of the first pivot leg 124 and the second pivot leg 128. In some embodiments, the inner surface of the apertures of joints 138 have a low coefficient of friction. In some embodiments, the inner surface of the apertures of joints 138 have a coefficient of friction such that the first pivot leg 124 and the second pivot leg 128 have resistance when rotating. In some embodiments, joints 138 can be sized to generally extend the distance between the inner surfaces of the top portion 104 and the bottom portion 120.

The heads of the first clevis pin 110 and second clevis pin 112 are configured to sit flush against the top surface of the top portion 104 when in use. The heads of the first clevis pin 110 and second clevis pin 112 are a size that is larger than the first top aperture 106, second top aperture 108, first bottom aperture 150, and second bottom aperture 152. The heads of the first clevis pin 110 and second clevis pin 112 have a cylindrical shape. In some embodiments, the heads of the first clevis pin 110 and second clevis pin 112 can be a variety of shapes, including polygons, prisms, spheres, half spheres, and/or other shapes and/or portions of shapes.

The heads of the first clevis pin 110 and second clevis pin 112 are coupled to an elongate portion having a length that is longer than the distance between the outer surfaces of the top portion 104 and bottom portion 120. The ends of the elongate portion of the first clevis pin 110 and second clevis pin 112, opposite the heads, are configured to interface with a locking mechanism that temporarily prevents the first clevis pin 110 and second clevis pin 112 from being removed from the main body 102. The ends of the elongate portion of the first clevis pin 110 and second clevis pin 112, opposite the heads, have an aperture that extends perpendicularly through the elongate portion. The first cotter pin 144 and second cotter pin 146 are inserted into the apertures that extend perpendicularly through the elongate portions of each of the first clevis pin 110 and the second clevis pin 112. The first cotter pin 144 and second cotter pin 146 have pliable portions that are configured to be manipulated such that the first cotter pin 144 and second cotter pin 146 do not inadvertently come free. The pliable portions of the first cotter pin 144 and second cotter pin 146 can be twisted, bent, pressed, and/or forced into a position that rests, respectively, against the first contact surface 140 and second contact surface 142, securing the first clevis pin 110 and second clevis pin 112.

Figure 1D:
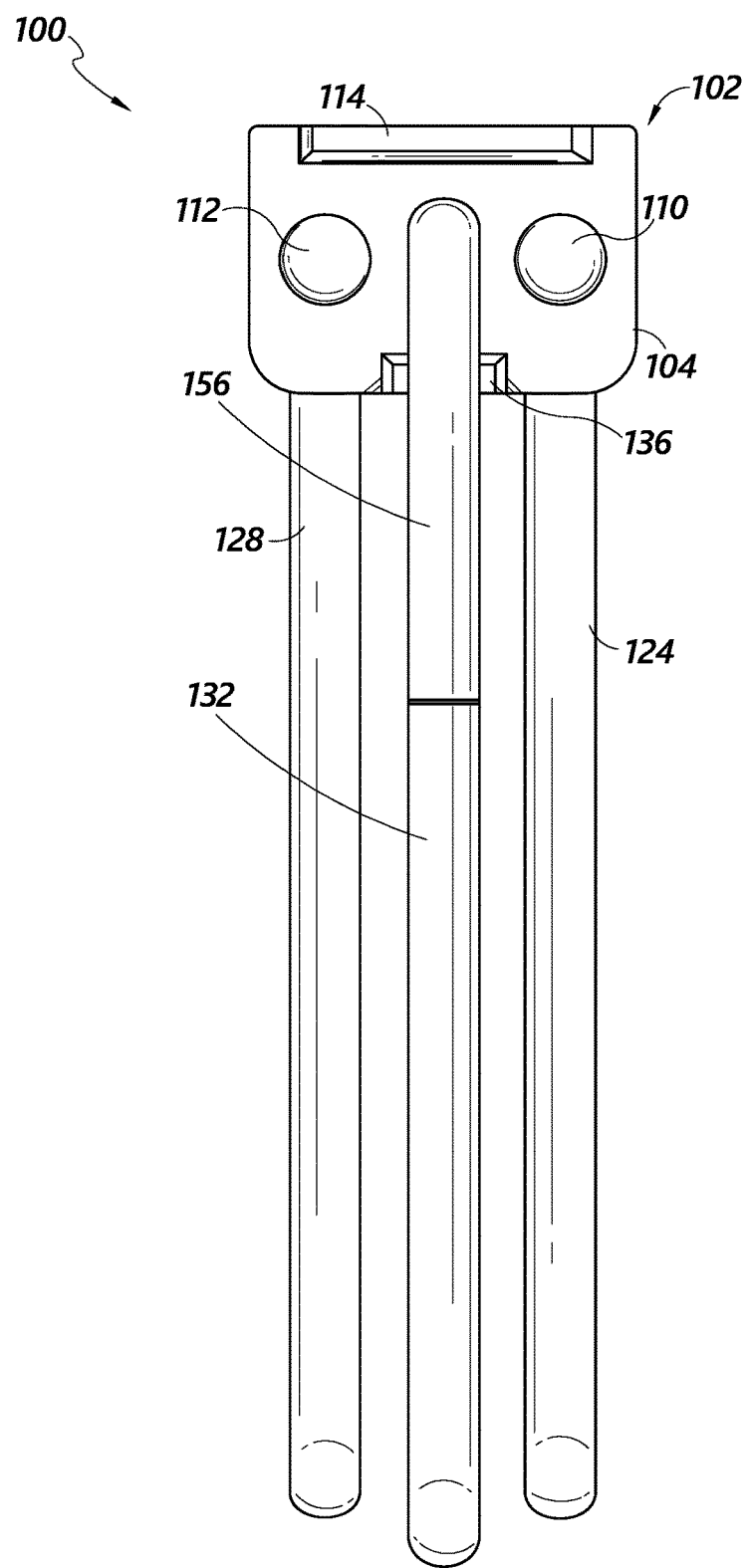
FIG. 1D illustrates a front view of the example tow device of FIG. 1A in a storage position.

The first pivot leg 124 and second pivot leg 128 rotate from a position that is generally parallel to the fixed leg 132, as shown in FIG. 1D, to a position where the longitudinal portion of each of the first pivot leg 124 and second pivot leg 128 comes in contact with the back portion 114. The first pivot leg 124 and second pivot leg 128 can be rotated to any position between parallel to the fixed leg 132 and contact with the back portion 114. In some embodiments, the angle between the fixed leg 132 and each of the first pivot leg 124 and second pivot leg 128 can be 0 to 180 degrees.

The first pivot leg 124 and second pivot leg 128 can be replaced or exchanged with new pivot legs. The first cotter pin 144 and second cotter pin 146 can be removed, allowing the first clevis pin 110 and the second clevis pin 112 to be uncoupled from the main body 102. Once the first clevis pin 110 and the second clevis pin 112 are removed, the first pivot leg 124 and the second pivot leg 128 can be exchanged or replaced with new pivot legs. New pivot legs can be coupled to the main body 102 as described herein.

In some embodiments, the first clevis pin 110 and the second clevis pin 112 are coupled to the main body 102 with bolts, pins, rivets, screw, and/or other similar devices that couple the first clevis pin 110 and the second clevis pin 112 to the main body while allowing the first pivot leg 124 and the second pivot leg 128 to rotate. In some embodiments, the first clevis pin 110 and the second clevis pin 112 are coupled to the main body 102 with lock washers, nuts, and/or other similar devices positioned on ends of the first clevis pin 110 and the second clevis pin 112 while allowing the first pivot leg 124 and the second pivot leg 128 to rotate. Other configurations can be implemented to rotatably couple the first pivot leg 124 and the second pivot leg 128 to the main body 102.

FIG. 1D is an illustration of tow device 100 in a storage position. In the storage position, the first pivot leg 124 and second pivot leg 128 are rotated to be generally parallel to the fixed leg 132. The tow device 100 can be placed in the storage position by tilting the fixed leg 132 vertically. The tilt causes the first pivot leg 124 and second pivot leg 128 to rotate such that the first pivot leg 124 and second pivot leg 128 are generally parallel to the fixed leg 132. The tow device 100 can be hung by handle 122 in the storage position. Storing the tow device 100 in the storage position can improve safety and spatial use in a warehouse.

Figure 1E:
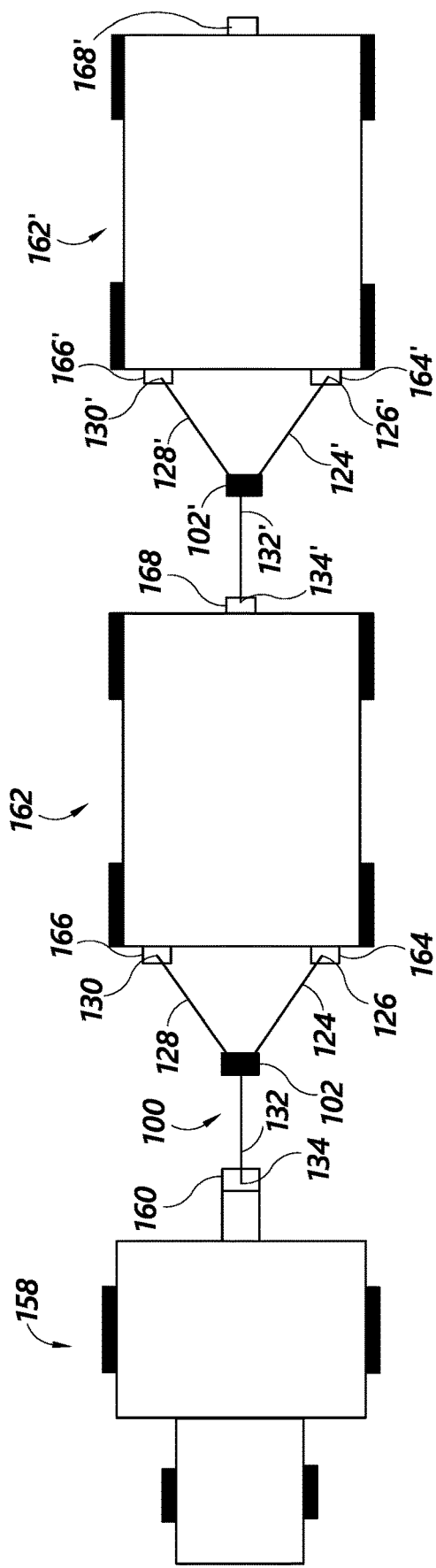
FIG. 1E illustrates a vehicle towing multiple containers using tow devices.

As illustrated in FIG. 1E, the tow device 100 can be used to tow containers. The containers can be used to transport items. The tow device 100 is used to tow a first container 162 with a vehicle 158. In some embodiments, the vehicle 158 is a powered industrial vehicle (PIV) such as an automated guided vehicle (AUV) or tug. To couple the vehicle 158 to the first container 162, the fixed mating portion 134 of the fixed leg 132 interfaces with a vehicle hitch 160, or other similar device, of the vehicle 158. In some embodiments, the vehicle hitch 160 is releasably coupled to the vehicle 158. The first mating portion 126 of the first pivot leg 124 interfaces with the first front container hitch 164. The second mating portion 130 of the second pivot leg 128 interfaces with the second front container hitch 166. In some embodiments, the first front container hitch 164 and second front container hitch 166 are releasably coupled to the first container 162. As described herein, the first pivot leg 124 and the second pivot leg 128 can be rotated to different orientations to appropriately position the first mating portion 126 and the second mating portion 130. During towing operations, the fixed leg 132 can pivot or rotate within the vehicle hitch 160 to permit movement when the container is moved around a corner or through a radius. In some embodiments, the pivoting of the legs described herein can allow freedom for a container to be pulled through a turn or a radius.

Several tow devices can be used to tow multiple containers. A second container 162' can be towed behind the first container 162 as described above using a second tow device 100'. The fixed mating portion 134' of the fixed leg 132' interfaces with the back container hitch 168 of the first container 162. The first mating portion 126' of the first pivot leg 124' interfaces with the first front container hitch 164' of the second container 162'. The second mating portion 130' of the second pivot leg 128' interfaces with the second front container hitch 166' of the second container 162'. A series of containers can be towed in this manner. In some embodiments, for safety or to meet other requirements, a maximum of three containers can be towed in sequence or in a train. In some embodiments, more than three containers can be towed in sequence or in a train.

Each of the components, features, and/or characteristics described above in reference to FIGS. 1A-1E can be made of various materials, which can include metals, metal alloys, polymers, carbon fiber, ceramics, and/or other suitable materials.

FIGS. 2A-2G are illustrations of an embodiment of a tow device having pivot legs that can be locked in position. Tow device 200 can have, but is not limited to, all the features and variation on features of tow device 100.

Figure 2A:
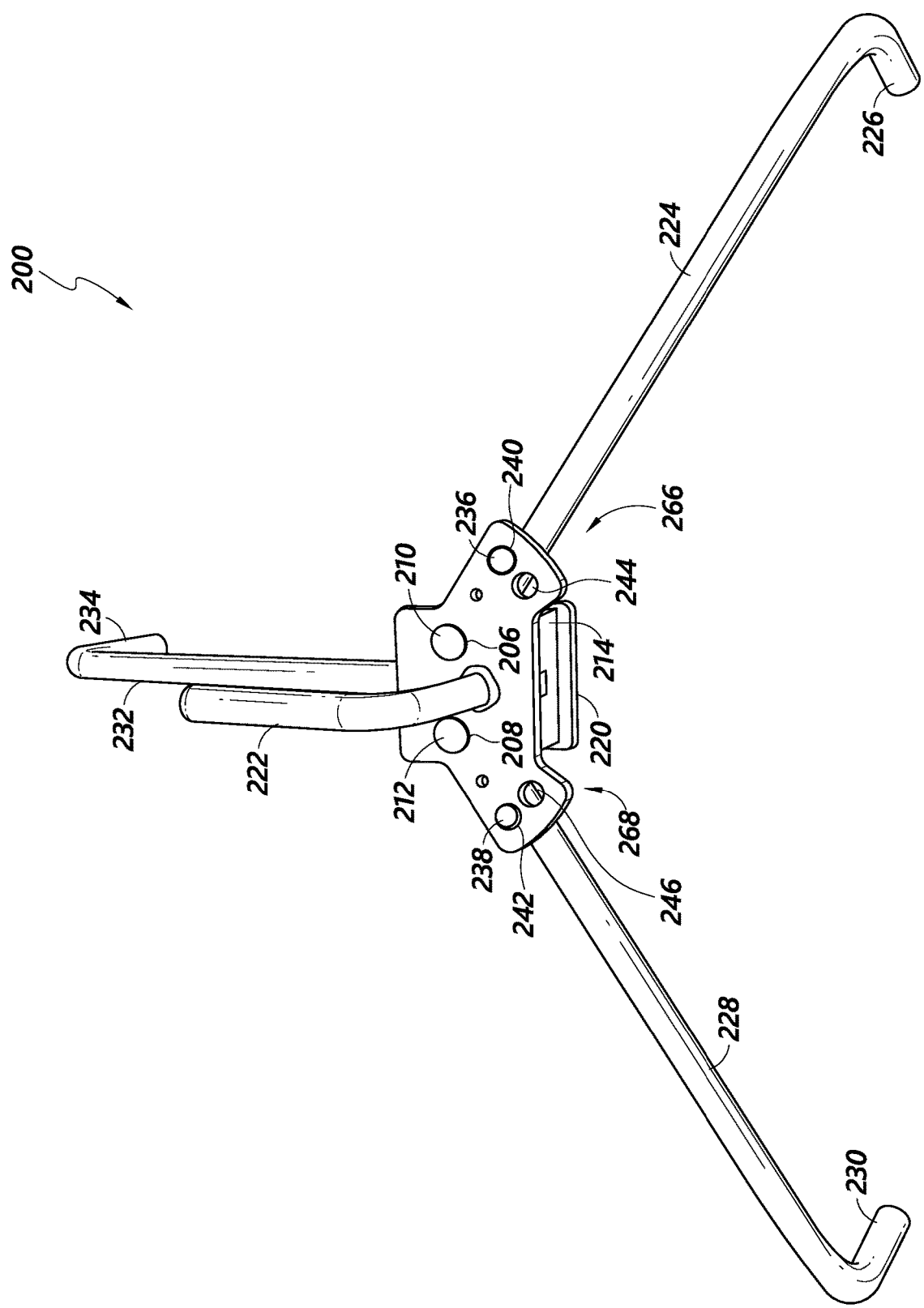
FIG. 2A illustrates a top perspective view of an example tow device.
Figure 2B:
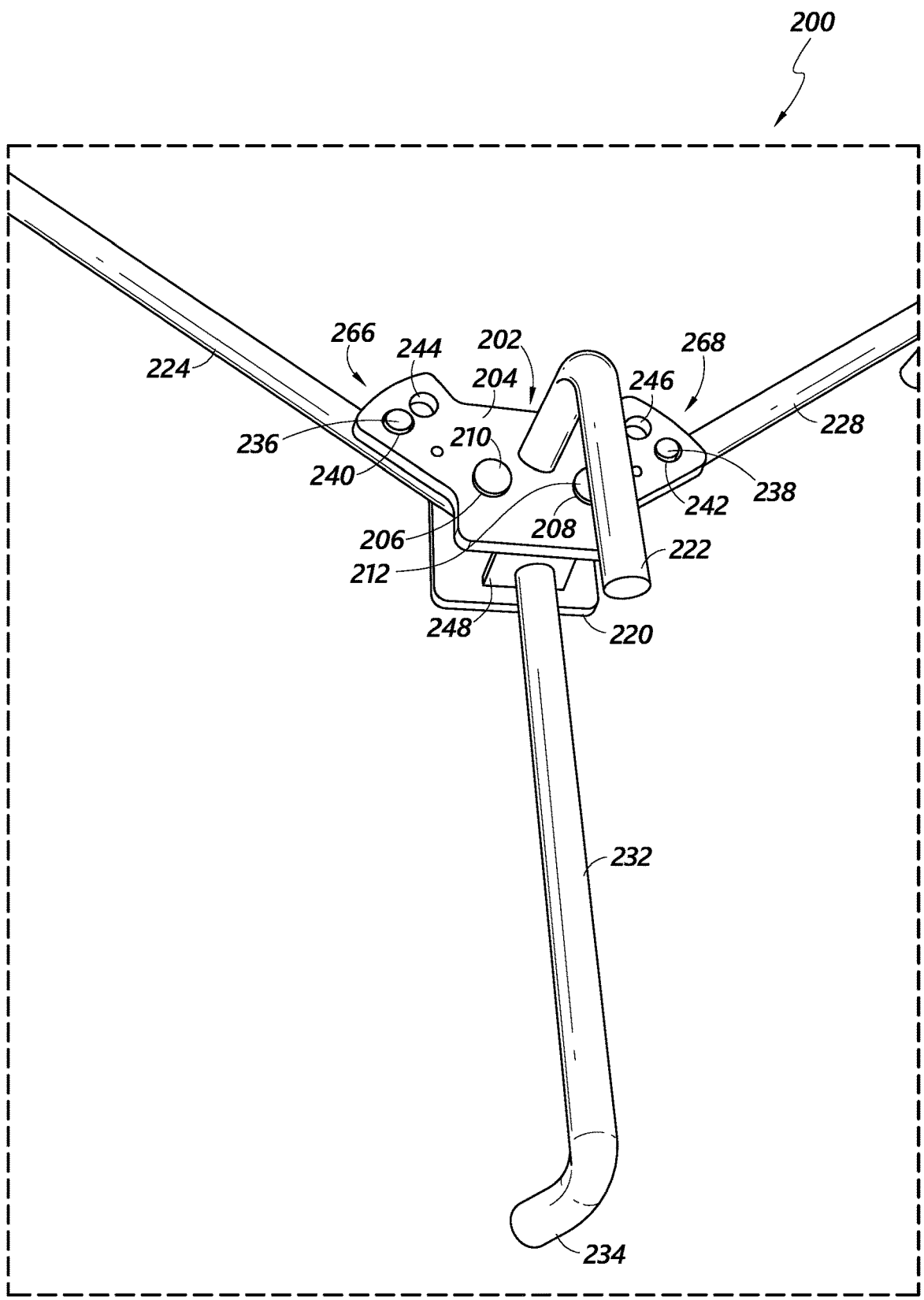
FIG. 2B illustrates a top perspective view of a portion of the example tow device of FIG. 2A.
Figure 2C:
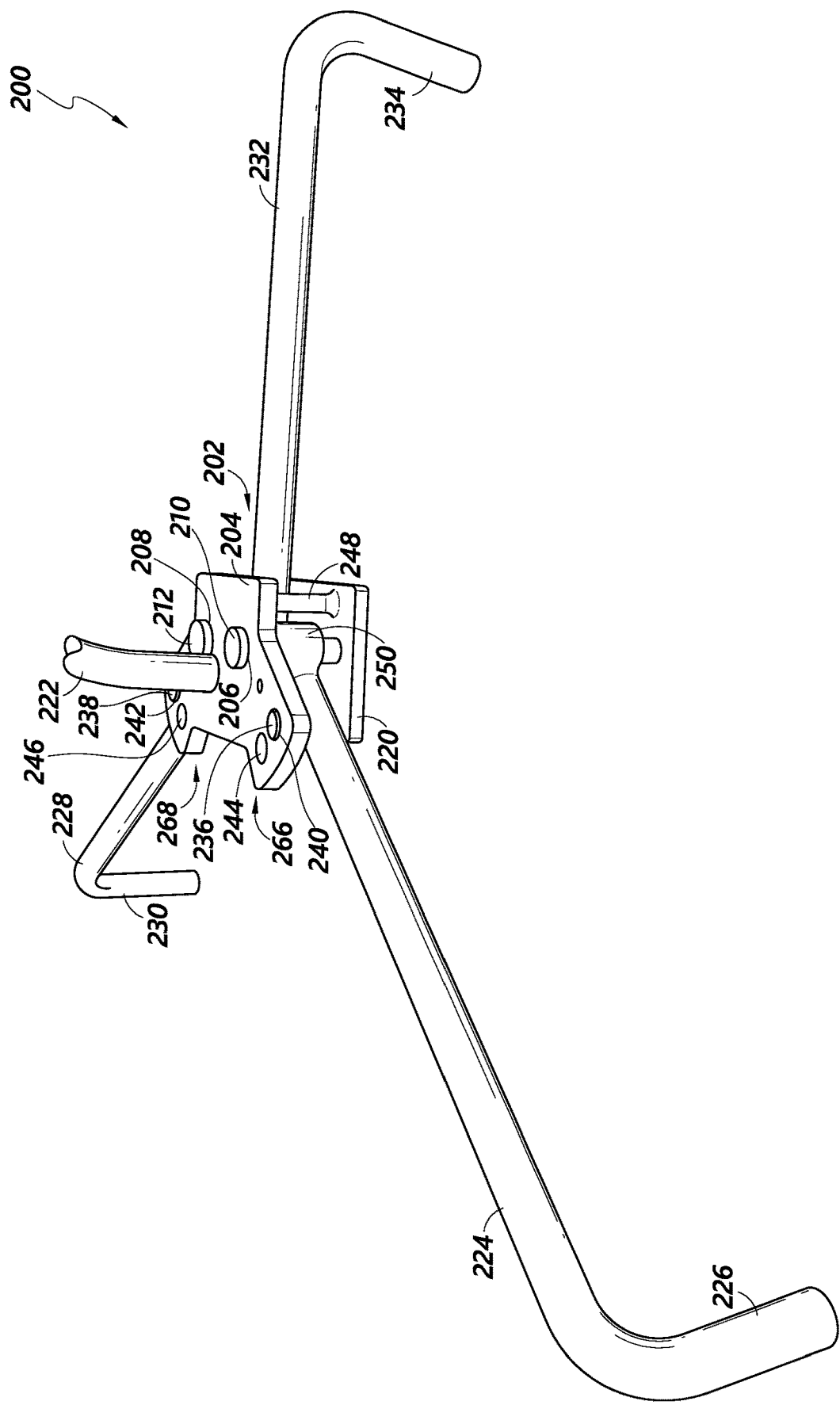
FIG. 2C illustrates a side perspective view of a portion of the example tow device of FIG. 2A.
Figure 2D:
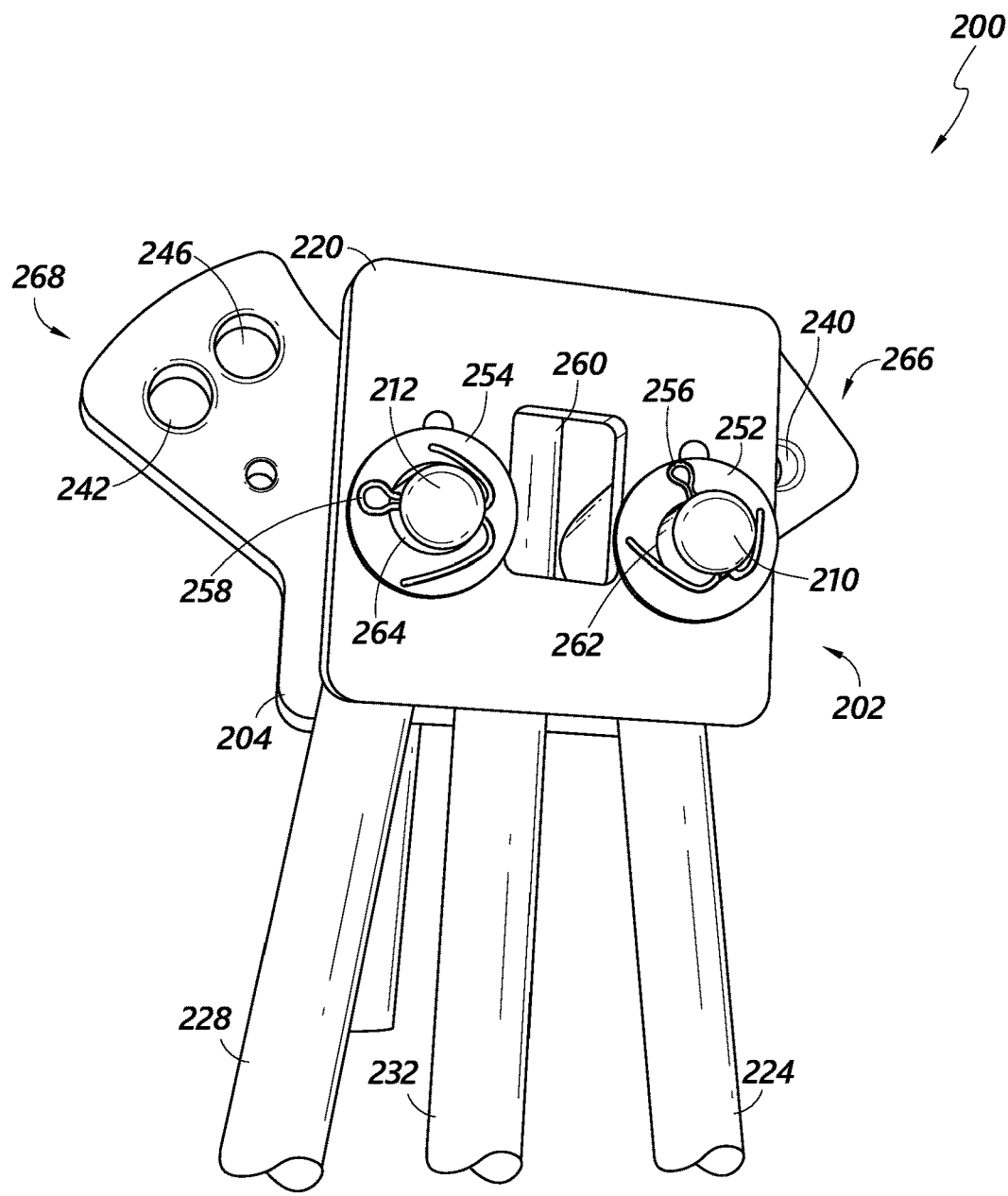
FIG. 2D illustrates a portion of the example tow device of FIG. 2A.

As shown in FIG. 2A, tow device 200 has a main body 202. The main body 202 has a top portion 204, back portion 214, bottom portion 220, and, as shown in FIG. 2B, a front portion 248. The top portion 204, back portion 214, bottom portion 220, and front portion 248 can be varying sizes, shapes, and or thicknesses. The top portion 204 is coupled to and/or has a handle 222 that is configured to be grasped by a user. The top portion 204 has a first top aperture 206 and second top aperture 208, each of which pierces the entire thickness of the top portion 204. As shown in FIG. 2D, the bottom portion 220 has a first bottom aperture 262 and second bottom aperture 264, each of which pierces the entire thickness of bottom portion 220. The first top aperture 206 and first bottom aperture 262 are positioned coaxially, defining a first pivot axis. The second top aperture 208 and second bottom aperture 264 are positioned coaxially, defining a second pivot axis. A first contact surface 252 can radially surround the perimeter of first bottom aperture 262. A second contact surface 254 can radially surround the perimeter of second bottom aperture 264. The first contact surface 252 and second contact surface 254 can be made from materials that are resistant to wear. The bottom portion 220 has a center bottom aperture 260. In some embodiments, the center bottom aperture 260 can allow a user to access the space between the front portion 248 and the back portion 214.

As shown in FIG. 2A, a plurality of legs extend away from main body 202, including a first pivot leg 224, a second pivot leg 228, and a fixed leg 232. The first pivot leg 224 has a first mating portion 226, the second pivot leg 228 has a second mating portion 230, and the fixed leg 232 has fixed mating portion 234. The first mating portion 226, second mating portion 230, and fixed mating portion 234 extend, respectively in a transversely downward direction from a longitudinal portion of each of the first pivot leg 224, a second pivot leg 228, and a fixed leg 232. The first mating portion 226, second mating portion 230, and fixed mating portion 234 are parallel. The first mating portion 226, second mating portion 230, and fixed mating portion 234 extend in a direction that is opposite the handle 222. The first mating portion 226, second mating portion 230, and fixed mating portion 234 are configured to releasably couple or connect to a hitch, tow pocket, and/or corresponding mating portion.

Figure 2E:
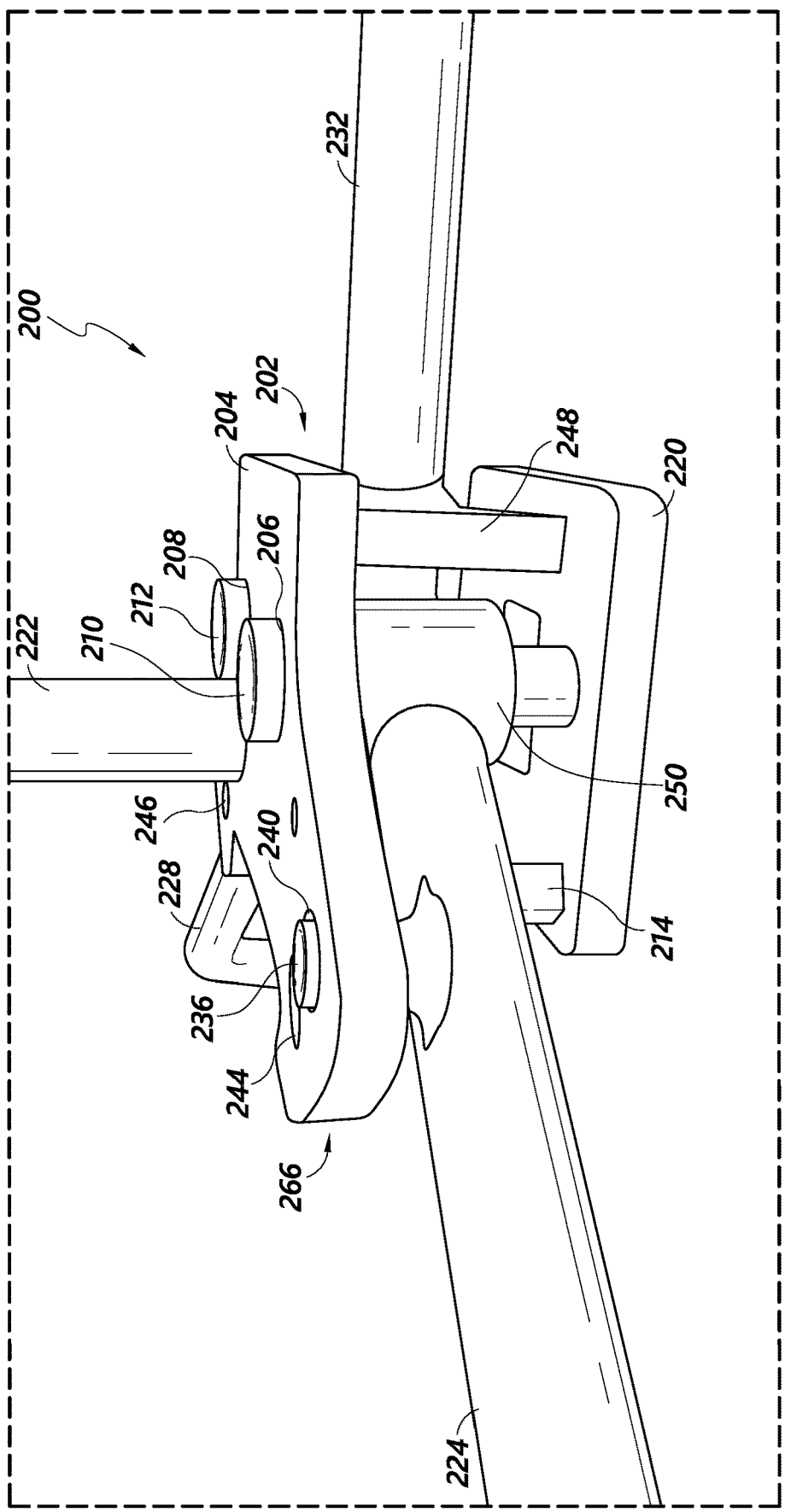
FIG. 2E illustrates a portion of the example tow device of FIG. 2A.
Figure 2F:
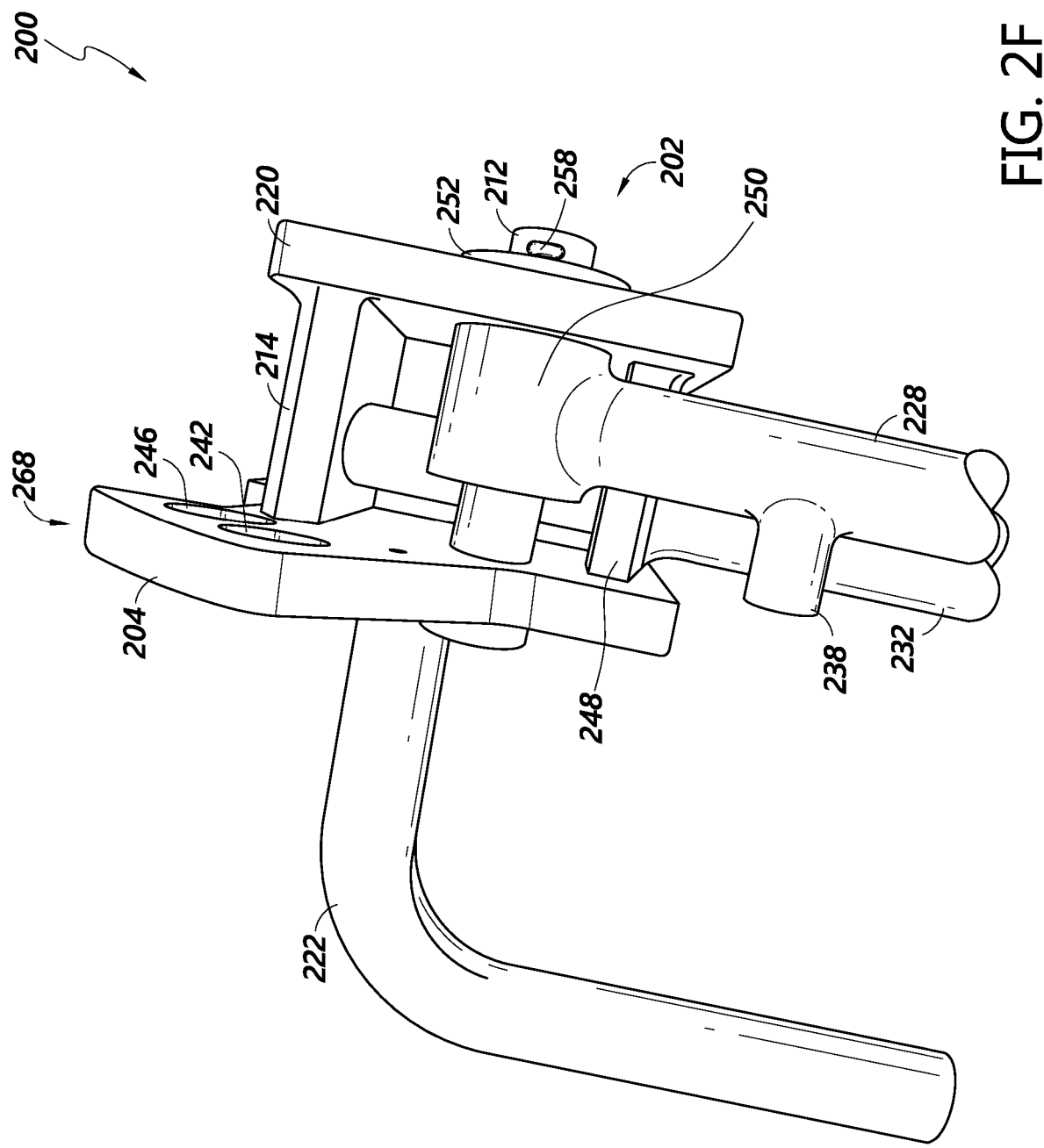
FIG. 2F illustrates a portion of the example tow device of FIG. 2A.

As shown in FIG. 2E, the fixed leg 232 is coupled to the main body 202. The fixed leg 232 is coupled to main body 202 such that fixed leg 232 is immobile relative to main body 202. The fixed leg 232 goes through and/or is coupled to the front portion 248. In some embodiments, the fixed leg 232 is coupled to the back portion 214.

As shown in FIG. 2A, the first pivot legs 224 and second pivot leg 228 are rotatably coupled to main body 202. As shown in FIG. 2E, the first pivot leg 224 and second pivot leg 228 each have a joint 250. The joints 250 have an aperture. The aperture of each joint 250 is coaxially aligned with the first or second pivot axis.

The aperture of joint 250 of the first pivot leg 224 is coaxially aligned with the first pivot axis defined by first top aperture 206 and first bottom aperture 262. The joint 250 of the first pivot leg 224 is positioned between the top portion 204 and the bottom portion 220. A first clevis pin 210 is positioned coaxially with the first pivot axis and mates with the first top aperture 206, the aperture of joint 250 of the first pivot leg 224, and the first bottom aperture 262. This allows the first pivot leg 224 to rotate about the first clevis pin 210. As shown in FIG. 2D, the first clevis pin 210 is releasably secured by a first cotter pin 256. The first clevis pin 210 can have a head on one end that has a diameter that is larger than the diameter of a longitudinal body portion that is coupled to one side of the head. The first clevis pin 210 can have an aperture, extending perpendicularly through the end of the longitudinal body portion opposite the head end, that is configured to interface with the first cotter pin 256. The first cotter pin 256 is inserted in the perpendicularly positioned aperture to rotatably couple the first pivot leg 224 to the first clevis pin 210 or removed to uncouple the first pivot leg 224 from the first clevis pin 210. In some embodiments, the first cotter pin 256 can make contact with the first contact surface 252 when inserted through the aperture of the first clevis pin 210 and manipulated to secure the first clevis pin 210.

The aperture of joint 250 of the second pivot leg 228 is coaxially aligned with the second pivot axis defined by the second top aperture 208 and second bottom aperture 264. The joint 250 of the second pivot leg 228 is positioned between the top portion 204 and the bottom portion 220. A second clevis pin 212 is positioned coaxially with the second pivot axis and mates with the second top aperture 208, the aperture of joint 250 of the second pivot leg 228, and the second bottom aperture 264. This allows the second pivot leg 228 to rotate about the second clevis pin 212. The second clevis pin 212 is releasably secured by the second cotter pin 258. The second clevis pin 212 has a head on one end that has a diameter that is larger than the diameter of a longitudinal body portion that is coupled to one side of the head. The second clevis pin 212 has an aperture, extending perpendicularly through the end of the longitudinal body portion opposite the head end, that is configured to interface with the second cotter pin 258. The second cotter pin 258 is inserted in the perpendicularly positioned aperture to rotatably couple the second pivot leg 228 to the second clevis pin 212 or removed to uncouple the second pivot leg 228 from the second clevis pin 212. In some embodiments, the second cotter pin 258 can make contact with the second contact surface 254 when inserted through the aperture of the second clevis pin 212.

As shown in FIG. 2A, the top portion 204 has a plurality of positioning apertures. The plurality of positioning apertures can be positioned anywhere on the top portion 204. The top portion 204 has four positioning apertures, which include first outer positioning aperture 240, second outer positioning aperture 242, first inner positioning aperture 244, and second inner positioning aperture 246. The first outer positioning aperture 240, second outer positioning aperture 242, first inner positioning aperture 244, and second inner positioning aperture 246 have the same size and shape—circular. In some embodiments, the first outer positioning aperture 240, second outer positioning aperture 242, first inner positioning aperture 244, and second inner positioning aperture 246 can be different sizes and/or shapes, including polygons or other suitable configurations. The first outer positioning aperture 240, second outer positioning aperture 242, first inner positioning aperture 244, and second inner positioning aperture 246 are configured to, respectively, interface with a first locking member 236 and second locking member 238

The top portion 204 can have a shape that includes a first arm portion 266 and a second arm portion 268. The first arm portion 266 and the second arm portion 268 can have varying lengths and sizes. The first arm portion 266 and the second arm portion 268 extend away from the main body 202 with the top surface of the first arm portion 266 and the second arm portion 268 coplanar with the top surface of the top portion 204. Each of first arm portion 266 and the second arm portion 268 can extend in a direction that is generally at a 90 to 180 degree angle from the longitudinal axis of the fixed leg 232. In some embodiments, each of the first arm portion 266 and the second arm portion 268 extend in a direction that is 1 to 180 degree angle or more from the other arm portion.

The first outer positioning aperture 240, second outer positioning aperture 242, first inner positioning aperture 244, and second inner positioning aperture 246 are positioned, respectively, on the first arm portion 266 and the second arm portion 268. The first outer positioning aperture 240 is placed on the first arm portion 266 and the second outer positioning aperture 242 is placed on the second arm portion 268. The first inner positioning aperture 244 is placed on the first arm portion 266 and the second inner positioning aperture 246 is placed on the second arm portion 268. The first inner positing aperture 244 and second inner positioning aperture 246 are spaced apart at a distance that is less than the distance between the first outer positioning aperture 240 and the second outer positioning aperture 242.

The first pivot leg 224 and second pivot leg 228 each have at least one locking member. The first pivot leg 224 has a first locking member 236. The second pivot leg 228 has a second locking member 238. The first locking member 236 and the second locking member 238 are configured to interface with the first outer positioning aperture 240, second outer positioning aperture 242, first inner positioning aperture 244, and second inner positioning aperture 246.

The first locking member 236 and the second locking member 238 are cylindrical members that extend vertically from the longitudinal portions of the first pivot leg 224 and the second pivot leg 228. The first locking member 236 and the second locking member 238 extend generally parallel to the first and second pivot axes. In some embodiments, the first locking member 236 and the second locking member 238 can be any size and/or shape, which can include polygonal.

The first locking member 236 and the second locking member 238 are portions of the first pivot leg 224 and second pivot leg 228. In some embodiments, the first locking member 236 and the second locking member 238 are coupled, welded, threaded, and/or otherwise attached to the first pivot leg 224 and the second pivot leg 228. In some embodiments, the first locking member 236 and the second locking member 238 are actuated to different positions, which may include not extruding beyond the cross-sectional profile of pivot legs 224 and 228. This can allow pivot legs 224 and 228 to freely rotate. In some embodiments, the first locking member 236 and the second locking member 238 can be actuated to interface with the first outer positioning aperture 240, second outer positioning aperture 242, first inner positioning aperture 244, and/or second inner positioning aperture 246. This can secure the first pivot leg 224 and the second pivot leg 228 in a position such that the first pivot leg 224 and the second pivot leg 228 do not rotate. In some embodiments, the actuation of the first locking member 236 and the second locking member 238 can be facilitated by a spring system. In some embodiments, actuation is manual or automatic.

Joints 250 of the first pivot leg 224 and second pivot leg 228 slide vertically up and down, respectively, the first clevis pin 210 and the second clevis pin 212. This facilitates the first locking member 236 and the second locking member 238 to engage and disengage with the first outer positioning aperture 240, second outer positioning aperture 242, first inner positioning aperture 244, and/or second inner positioning aperture 246. For example, a user can rotate the first pivot leg 224 to position the first locking member 236 coaxially with the first outer positioning aperture 240 and lift the first pivot leg 224 such that the first locking member 236 interfaces with the first outer positioning aperture 240. A user disengages the first locking member 238 from the first outer positioning aperture 240 by pushing down on the first pivot leg 224, resulting in the first locking member 236 being removed from the first outer positioning aperture 240.

The first pivot leg 224 and second pivot leg 228 can be temporarily fixed in a variety of positions by interfacing the first locking member 236 and second locking member 238 with the first outer positioning aperture 240, second outer positioning aperture 242, first inner positioning aperture 244, and/or second inner positioning aperture 246. The first pivot leg 224 and second pivot leg 228 can be positioned in a wide angle configuration. The first pivot leg 224 is positioned such that the first locking member 236 interfaces with the first outer positioning aperture 240. The second pivot leg 228 is positioned such that second locking member 238 interfaces with the second outer positioning aperture 242. The first pivot leg 224 and second pivot leg 228 can be positioned in a narrower angle configuration. The first pivot leg 224 is positioned such that the first locking member 236 interfaces with the first inner positioning aperture 244. The second pivot leg 228 is positioned such that second locking member 238 interfaces with the second inner positioning aperture 246. This results in a configuration where the angle between first pivot leg 224 and second pivot leg 228 is smaller than the angle between the first pivot leg 224 and second pivot leg 228 in the wide-angle configuration.

Figure 2G:
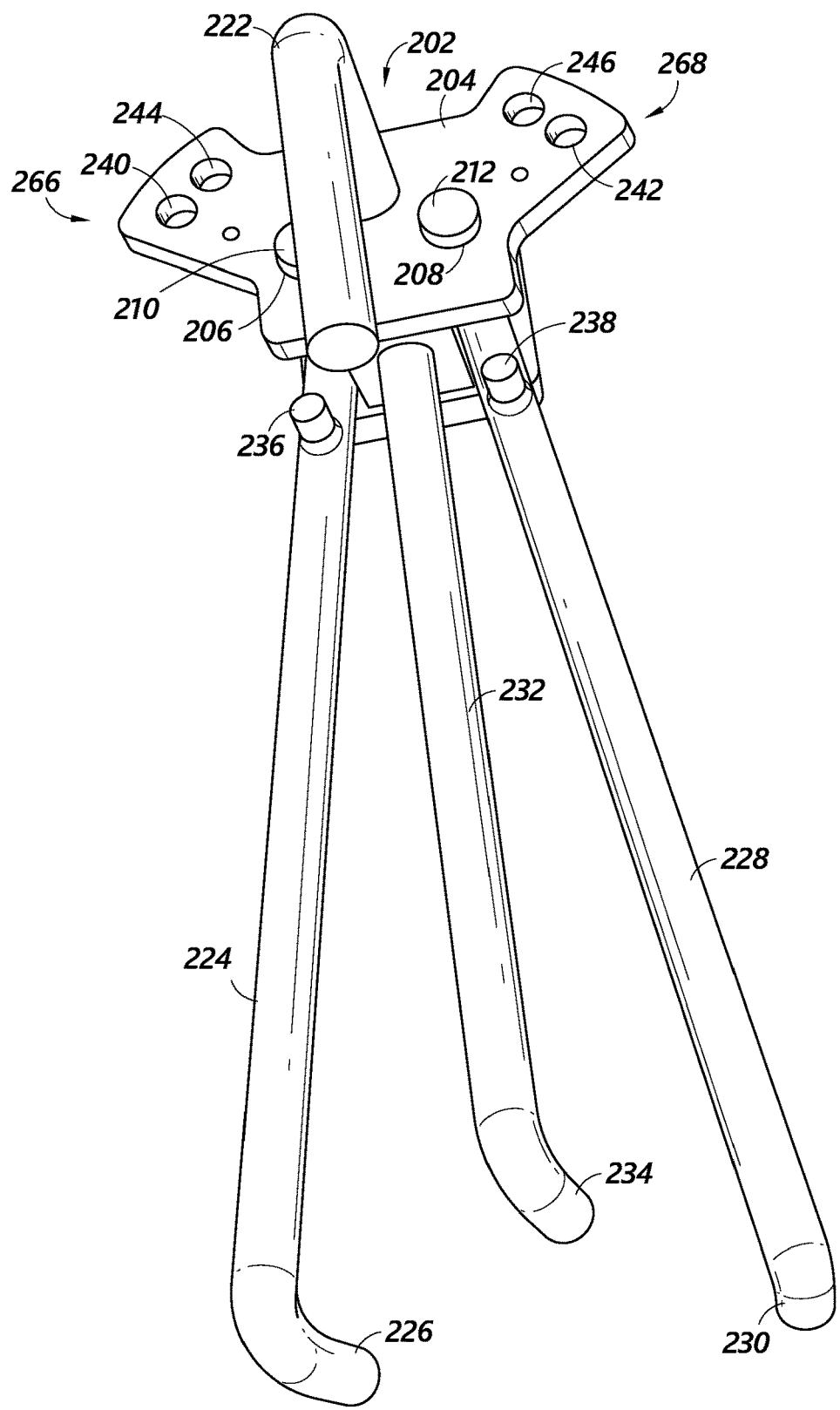
FIG. 2G illustrates the example tow device of FIG. 2A in a storage position.

FIG. 2G is an exemplary illustration of a tow device 200 in a storage position. In the storage position, the first pivot leg 224 and second pivot leg 228 are rotated to be generally adjacent and/or parallel to the fixed leg 232. The tow device 200 can be placed in the storage position by tilting the fixed leg 232 vertically downward. When the first locking member 236 and second locking member 238 are disengaged, the tilt causes the first pivot leg 224 and second pivot leg 228 to rotate such that the first pivot leg 224 and second pivot leg 228 are generally adjacent and/or parallel to the fixed leg 232. The tow device 200 can be hung by handle 222 in the storage position. In some embodiments, the first pivot leg 224 and the second pivot leg 228 can be locked in the storage position. Storing the tow device 200 in the storage position can improve safety and spatial use in a warehouse.

In use, the tow device 200 can be used to tow containers in the same manner as the tow device 100. Using locking members and positioning apertures, the first pivot leg 224 and second pivot leg 228 can be temporarily fixed in configurations such that the first mating portion 226 and second mating portion 230 are appropriately spaced to releasably interface or connect to a hitch, tow pocket, and/or corresponding mating portion.

Each of the components, features, and/or characteristics described above in reference to FIGS. 2A-2G can be made of various materials, which can include metals, metal alloys, polymers, carbon fiber, ceramics, and/or other suitable materials.

Figure 3A:
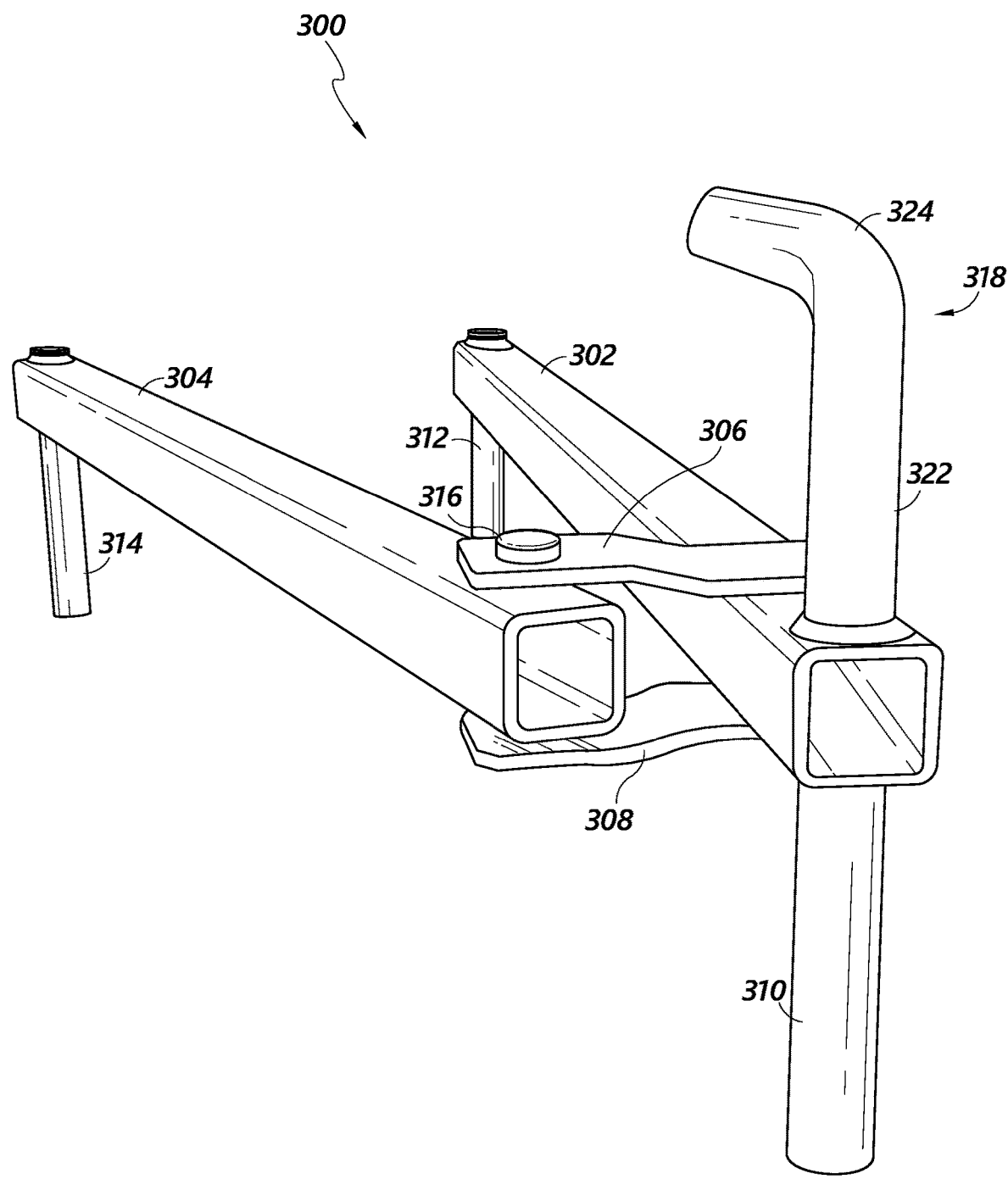
FIG. 3A illustrates an example tow device.
Figure 3B:
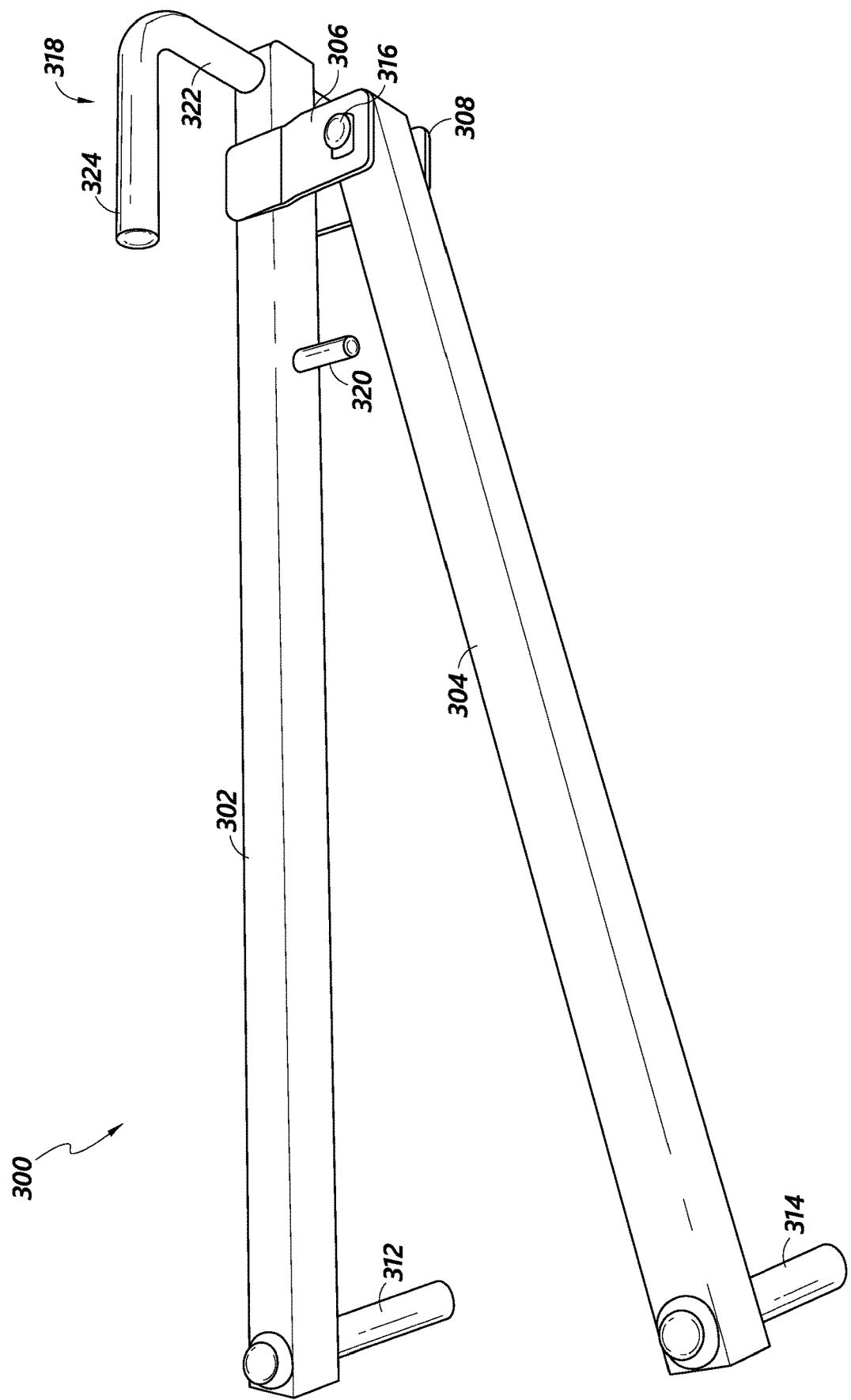
FIG. 3B illustrates another view of the example tow device of FIG. 3A.
Figure 3C:
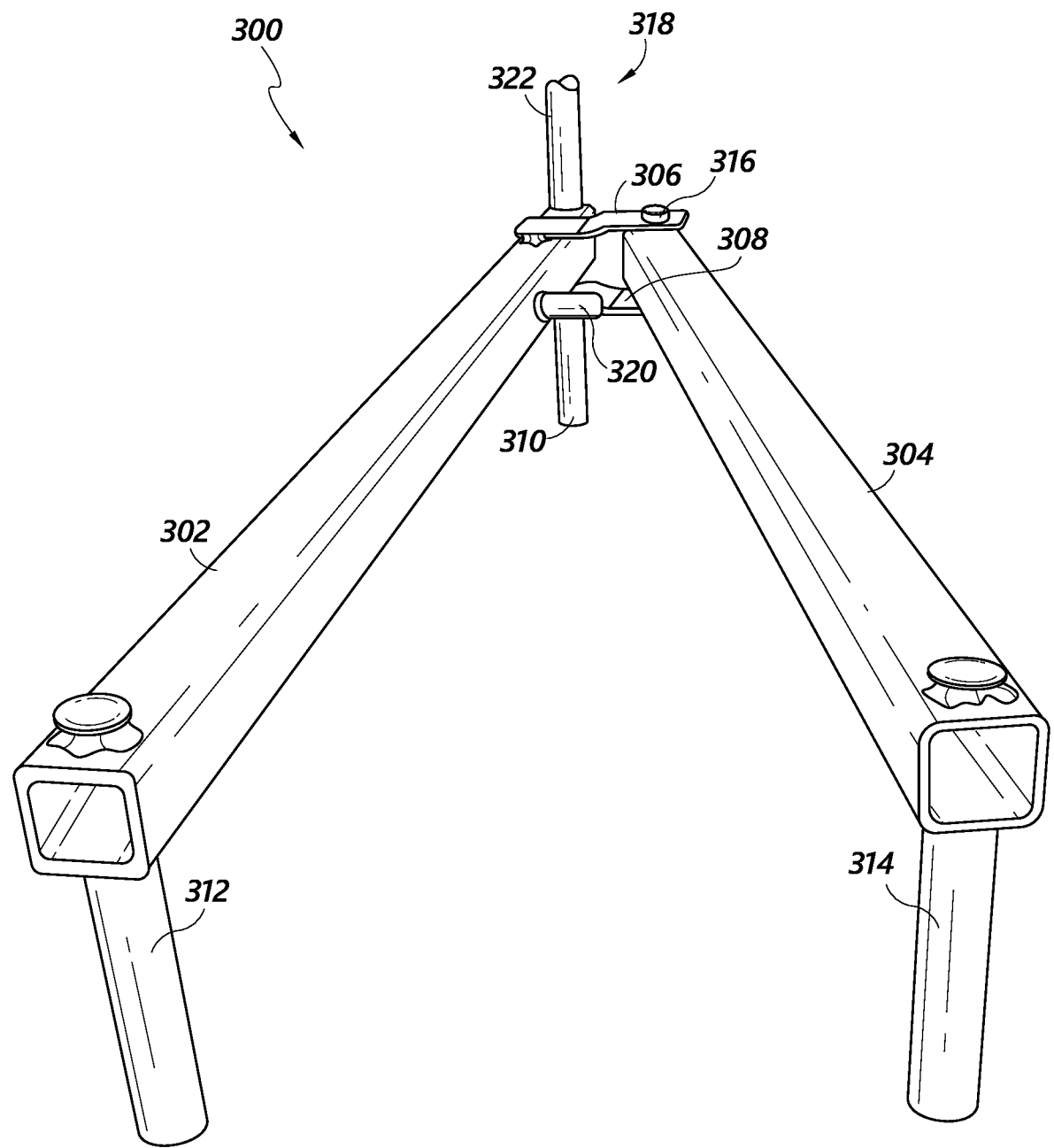
FIG. 3C illustrates another view of the example tow device of FIG. 3A.

FIGS. 3A-3C are illustrations of an embodiment of a tow device. As illustrated in FIG. 3A, tow device 300 has a fixed leg 302. The fixed leg 302 has an elongate body. The fixed leg 302 is made of square tubing, which includes standard square tubing. Using standard square tubing can reduce manufacturing complexity and/or cost. In some embodiments, fixed leg 302 has various cross-sections, including hollow, circular, polygonal, or other suitable shapes.

Fixed leg 302 has a handle 318 positioned proximate an end of fixed leg 302. Handle 318 can have at least any of the characteristics and/or variations of handles 122 and 222. Handle 318 has a vertical portion 322 that extends transversely in an upward direction from the longitudinal direction of fixed leg 302. Handle 318 has a horizontal portion 324 that extends transversely from the longitudinal direction of the vertical portion 322. The horizontal portion 324 of handle 318 is parallel to the fixed leg 302. The horizontal portion of the handle 318 is offset above the elongate body of the fixed leg 302. The handle 318 has a circular cross-section. In some embodiments, the handle 318 has cross-sections having a variety of shapes, including polygonal, tubular, hollow, or other suitable shapes. A curve defines the transition between the vertical portion 322 and the horizontal portion 324 of the handle 318. In some embodiments, a ninety-degree angle defines the transition between the vertical portion 322 and the horizontal portion 324. The tow device 300 can be hung by handle 318 when stored.

The fixed leg 302 has a mating portion 310 positioned proximate the same end of fixed leg 302 as the handle 318. The mating portion 310 extends transversely downward from the longitudinal direction of the fixed leg 302. Mating portion 310 extends in the opposite direction as the vertical portion 322 of handle 318. The mating portion 310 is positioned coaxially with the axis of the vertical portion of handle 318.

The fixed leg 302 has a mating portion 312 positioned proximate an end of fixed leg 302 that is generally opposite mating portion 310. The mating portion 312 extends transversely downward from the longitudinal direction of fixed leg 302. The mating portion 312 extends in the opposite direct as the vertical portion of handle 318. The mating portion 312 is parallel to mating portion 310. The mating portion 312 extends through fixed leg 302 such that an end of mating portion 312 is on one side of fixed leg 302 and an opposing end of mating portion 312 is on another side of fixed leg 302.

The tow device 300 has a top portion 306 and a bottom portion 308. The top portion 306 and bottom portion 308 are tabs. The top portion 306 and bottom portion 308 are coupled to the fixed leg 302. In some embodiments, top portion 306 and bottom portion 308 are welded onto fixed leg 302. The top portion 306 and bottom portion 308 each include two substantially flat planes at different elevations, a first and second plane. A curve, incline, and/or step transitions between the first plane and the second plane. The first plane of the top portion 306 is coupled to the top surface of the fixed leg 302 such that the second plane of the top portion 306 is positioned at a higher elevation relative to the first plane. The first plane of the bottom portion 308 is coupled to the bottom surface of the fixed leg 302 such that the second plane of the bottom portion 308 is positioned at a lower elevation relative to the first plane. The top portion 306 and bottom portion 308 are parallel and offset from each other. The second plane of the top portion 306 and the second plane of the bottom portion 308 are offset from each other. The distance between the second plane of the top portion 306 and the second plane of the bottom portion 308 is greater than the cross-section of the pivot leg 304. The top portion 306 and bottom portion 308 extend transversely from the longitudinal direction of the fixed leg 302.

Tow device 300 has a pivot leg 304. The pivot leg 304 can has an elongate body. The pivot leg 304 is made of square tubing, which can include standard square tubing. In some embodiments, the pivot leg 304 can have various cross-sections, including hollow, circular, polygonal, or other suitable shapes. The pivot leg 304 has a mating portion 314 positioned proximate an end of the pivot leg 304. The mating portion 314 extends transversely downward from the longitudinal direction of pivot leg 304. The mating portion 314 can extend in the opposite direct as the vertical portion 322 of handle 318. The mating portion 314 is parallel to the mating portion 310 and/or mating portion 312. The mating portion 314 is welded to pivot leg 304. In some embodiments, mating portion 314 extends through pivot leg 304 such that an end of mating portion 314 is on one side of pivot leg 304 and an opposing end of mating portion 314 is on an opposing side of pivot leg 304. In some embodiments, mating portions 310, 312, and 314 have circular cross section shapes.

The mating portions 310, 312, and 314 are all the same length and/or have the same cross-sectional shape. In some embodiments, mating portions 310, 312, and 314 have varying lengths and/or cross-sectional shapes. The mating portions 310 and 312 are welded to fixed leg 302.

Pivot leg 304 is rotatably coupled to fixed leg 302. The end of pivot leg 304 opposite the mating portion 314 is rotatably coupled to fixed leg 302. Pivot leg 304 is coupled to fixed leg 302 by a pin 316 that extends through a portion of pivot leg 304 proximate the end opposite the mating portion 314. The top portion 306 has an aperture, the bottom portion 308 has an aperture, and the pivot leg 304 has an aperture positioned on the end portion of pivot leg 304 opposite the mating portion 314. The pivot leg 304 is rotatably coupled by coaxially aligning the apertures of the top portion 306, pivot leg 304, and bottom portion 308, and once aligned, placing pin 316 in the apertures and coupling the pin 316 to the top portion 306 and bottom portion 308. The pin 316 is welded to the top portion 306 and bottom portion 308. The end portion of pivot leg 304, opposite mating portion 314, is positioned between the offset second planes of the top portion 306 and bottom portion 308 such that the pivot leg 304 is not flush with both the top portion 306 and bottom portion 308 at the same time when rotatably coupled. In some embodiments, pivot leg 304 is coupled to the top portion 306 and bottom portion 308 with a clevis pin and cotter pin, as described herein, or in another suitable configuration.

As shown in FIGS. 3B and 3C, fixed leg 302 has an extrusion 320. Extrusion 320 extends transversely from the longitudinal direction of the fixed leg 302. The extrusion 320 extends in a horizontal direction. The extrusion 320 extends in a direction that is parallel to the longitudinal direction of the top portion 306 and bottom portion 308. The extrusion 320 extends transversely from the longitudinal direction of the fixed leg 302 such that the extrusion 320 is positioned between the fixed leg 302 and the pivot leg 304 when the tow device 300 is oriented vertically and pivot leg 304 is free to hang substantially parallel to the fixed leg 302. The extrusion 320 prevents the end of pivot leg 304 with mating portion 314 from making contact with the end of fixed leg 302 with mating portion 312. The extrusion 320 is cylindrical. Extrusion 320 has a rounded free end. The extrusion 320 is coupled to fixed leg 302, which includes being welded to fixed leg 302. The extrusion 320 is positioned on the half of fixed leg 302 that is coupled to the top portion 306 and bottom portion 308. In some embodiments, extrusion 320 can have a variety of sizes and shapes, which can include polygonal, tubular, or other suitable cross-sections. In some embodiments, the pivot leg 304 has an extrusion.

Tow device 300 can be placed in a storage position that is the same or similar to the storage position of other tow devices disclosed herein. The process for placing the tow device 300 in the storage position is the same or similar to the processes disclosed herein in relation to other tow devices. In the storage position, the pivot leg 304 rotates to be proximate and/or substantially parallel to the fixed leg 302. The extrusion 320 makes contact with pivot leg 304, such that the elongate body of the fixed leg 302 and pivot leg 304 do not make contact.

In use, the tow device 300 can be used to tow containers in the same or similar manner as other tow devices disclosed herein. Mating portions 310, 312, and 314 of tow device 300 can releasably couple or connect to a hitch, tow pocket, and/or corresponding mating portion. One or more tow devices 300 can be employed to allow a vehicle to tow one or more wire containers, pallets, wheeled shelves, bins, and/or other device.

Each of the components, features, and/or characteristics described above in reference to FIGS. 3A-3C can be made of various materials, which can include metals, metal alloys, polymers, carbon fiber, ceramics, and/or other suitable materials.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present disclosure. This disclosure is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this disclosure be limited to the specific embodiments disclosed herein, but that it cover all modifications and alternatives coming within the true scope and spirit of the disclosure as embodied in the attached claims.

While the above detailed description has shown, described, and pointed out novel features of the improvements as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A tow device, the tow device comprising:
   a main body comprising a top portion and a bottom portion
   a plurality of legs comprising a fixed leg, a first pivot leg, and a second pivot leg;
      wherein a first end of the fixed leg is coupled to the main body such that the fixed leg is immobile in relation to the main body;
      wherein a first end of each of the first and second pivot legs are rotatably coupled to the main body; and
      wherein each of the plurality of legs comprises a longitudinal portion extending from the first end of each of the plurality of legs to a second end of each of the plurality of legs, and wherein the second end of each of the plurality of legs comprises a mating portion extending transversely from the longitudinal portion of each of the plurality of legs.

2. The tow device of claim 1, wherein the top portion comprises at least two apertures formed therein, wherein the bottom portion comprises at least two apertures formed therein, and wherein each of the at least two apertures of the top portion are positioned coaxially with one of the at least two apertures of the bottom portion to define at least two pivot axes.

3. The tow device of claim 2, wherein the first end of each of the first and second pivot legs comprises a joint having an aperture, wherein each aperture of each joint is positioned coaxially with one of the at least two pivot axes and between the top portion and the bottom portion, and wherein each joint is rotatably coupled to the main body by a clevis pin and a cotter pin.

4. The tow device of claim 1, wherein the top portion comprises a handle which comprises a vertical portion and a grasping portion, wherein the vertical portion extends perpendicularly from a longitudinal plane of the top portion, and a grasping portion extends transversely from the longitudinal axis of the vertical portion.

5. The tow device of claim 1, wherein the first and second pivot legs are configured to rotate to a position adjacent the fixed leg for compact storage with the tow device.

6. The tow device of claim 3, wherein the first and second pivot legs are each configured to be removed by removing the clevis and cotter pins.

7. A tow device, the tow device comprising:
   a main body comprising a top portion, a bottom portion, and a plurality of positioning apertures;
   a plurality of legs comprising a fixed leg, a first pivot leg, and a second pivot leg;
      wherein a first end of the fixed leg is coupled to the main body such that the fixed leg is immobile in relation to the main body;
      wherein a first end of each of the first and second pivot legs are rotatably coupled to the main body;
      wherein a locking member is positioned between the first end and a second end of each of the first and second pivot legs, wherein each locking member is configured to interface with the plurality of positioning apertures of the main body such that the first and second pivot legs are configured to be disposed in at least a first position and a second position; and
      wherein each of the plurality of legs comprises a longitudinal portion extending from the first end of each of the plurality of legs to the second end of each of the plurality of legs; and wherein the second end of each of the plurality of legs comprises a mating portion extending transversely from the longitudinal portion of each of the plurality of legs.

8. The tow device of claim 7, wherein the top portion comprises at least two apertures formed therein, wherein the bottom portion comprises at least two apertures formed therein, wherein each of the at least two apertures of the top portion are positioned coaxially with one of the at least two apertures of the bottom portion to define at least two pivot axes, wherein the first end of each of the first and second pivot legs comprises a joint having an aperture, wherein each joint is positioned coaxially with one of the at least two pivot axes and between the top portion and the bottom portion.

9. The tow device of claim 7, wherein the plurality of positioning apertures are disposed on the top portion.

10. The tow device of claim 7, wherein the plurality of positioning apertures comprise a pair of outer positioning apertures and a pair of inner positioning apertures, wherein the outer positioning apertures are configured to position the first and second pivot legs in an outer position, defining an outer angle, when each locking member is interfacing with the outer positioning apertures, and wherein the inner positioning apertures are configured to position the first and second pivot legs in an inner position, defining an inner angle that is smaller than the outer angle, when each locking member is interfacing with the inner positioning apertures.

11. The tow device of claim 7, wherein each of the locking members extend transversely from the longitudinal portion of each of the first and second pivot legs.

12. The tow device of claim 7, wherein the first and second pivot legs are configured to rotate to a position adjacent the fixed leg with the locking members disengaged from the plurality of positioning apertures.

13. The tow device of claim 8, wherein the first and second pivot leg are each configured to be removed by removing the clevis and cotter pins.

14. A tow device, the tow device comprising:
a fixed leg comprising a first end and a second end, wherein the first end comprises a first mating portion and the second end comprises a second mating portion, and wherein the first and second mating portions extend transversely from a longitudinal direction of the fixed leg;
a pivot leg comprising a first end and second end, the first end of the pivot leg being rotatably coupled proximate to the first end of the fixed leg and the second end of the pivot leg comprising a second mating portion, wherein the second mating portion of the second end of the pivot leg extends transversely from a longitudinal portion extending between the first and second ends of the pivot leg; and
a top portion and a bottom portion, wherein the top portion and bottom portion are coupled to the fixed leg such that the top portion and bottom portion are offset from each other, wherein the first end of the pivot leg is positioned between the top portion and bottom portion, and wherein the first end of the pivot leg is rotatably coupled to the fixed leg by a pin extending through the first end of the pivot leg, top portion, and bottom portion.

15. The tow device of claim 14, wherein the pivot leg comprises an aperture on the first end through which the pin is inserted, and wherein the pin is coupled to the top portion and bottom portion.

16. The tow device of claim 14, wherein an offset distance between the top and bottom portions is greatest where the pivot leg is disposed between the top and bottom portions.

17. The tow device of claim 14, wherein the fixed leg and/or the pivot leg comprises an extrusion that extends transversely from a longitudinal direction of the respective leg from which the extrusion extends, and wherein the extrusion is configured to prevent the second ends of the fixed leg and pivot leg from touching.

18. The tow device of claim 14, wherein the pivot leg is configured to rotate to a position proximate the fixed leg for compact storage.

19. The tow device of claim 14, wherein a handle is positioned on the first end of the fixed leg, and wherein the handle comprises a vertical portion that extends in a direction opposite the mating portion of the first end of the fixed leg.

* * * * *